JOHAN P. JENSEN, JENS P. JENSEN & HANS C. PETERSEN.
AUTOMATIC WAGON BRAKE.
APPLICATION FILED JULY 25, 1910.

1,002,155.

Patented Aug. 29, 1911.

UNITED STATES PATENT OFFICE.

JOHAN P. JENSEN, JENS P. JENSEN, AND HANS C. PETERSEN, OF FOLEY BROOK, VICTORIA, CANADA.

AUTOMATIC WAGON-BRAKE.

1,002,155.  Specification of Letters Patent.  Patented Aug. 29, 1911.

Application filed July 25, 1910. Serial No. 573,813.

*To all whom it may concern:*

Be it known that we, JOHAN P. JENSEN, JENS P. JENSEN, and HANS C. PETERSEN, all citizens of Canada, residing at Foley Brook, Province of Victoria, Canada, have invented certain new and useful Improvements in Automatic Wagon-Brakes, of which the following is a specification.

Our invention relates to wagon brakes and has particular reference to brakes which will set automatically on a down grade by taking advantage of the upward movement of the wagon tongue taking place when the wagon is pushed against the tongue and neck-yoke. We are aware of the existence of a number of other devices designed to set the brakes by the movement of the wagon tongue against the neck-yoke, and the object of our invention is to provide an improved construction adapted to more efficiently, economically and inexpensively carry out this object.

With the above named object in view our invention consists in the novel construction, combination and arrangement of parts hereinafter described in detail, illustrated in the accompanying drawing and incorporated in the appended claim.

Figure 1:
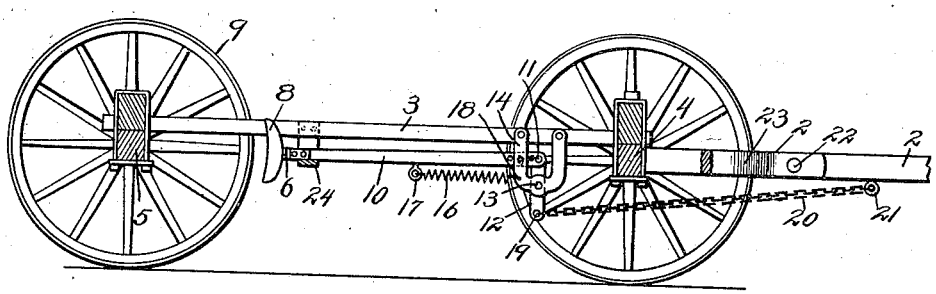
Figure 2:
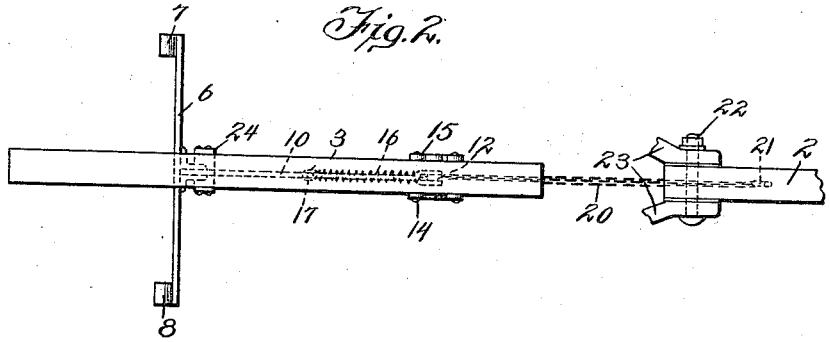

In the drawing—Figure 1 is a side elevation, partly in section, of a wagon equipped with a brake-mechanism embodying our invention. Fig. 2 is a plan view of the brake-mechanism.

Referring in detail to the several views, 2 represents the wagon tongue, 3 the reach between the front and rear axles 4 and 5, and 6 is a brake-beam carrying the usual brakes 7 and 8 for rear wheels 9. The brake-beam 6 is actuated by a beam or bar 10 extending along the underside of the reach and having its rear end secured to the brake-beam while its forward end is pivoted at 11 to the upper end of a lever 12 fulcrumed at 13 between two brackets 14 and 15 secured to and suspended from the reach 3. A tension spring 16 normally holds the bar 10 and brake-beam away from the wheels, one end of said spring being secured at 17 to the reach and at 18 to the bracket 14. To the lower end of the lever 12 is secured at 19 one end of a chain 20, and the other end of said chain is secured at 21 to the underside of the tongue 2 pivoted on a bolt 22 which passes through the fore-hounds 23. The rear end of the bar 10 is slidably supported on a U-shaped bracket 24 pendant from the reach 3. As shown the bar 10 is spaced apart from the reach which will permit vertical movement of the brake-beam and brake-shoes thereon to prevent braking when the wagon is backed up, or the wheels rotated backward instead of forward. This simple arrangement obviates the necessity of loosely and more or less insecurely mounting the brake-shoes and the expense and complication incident to such mountings, and leaves the brake-beams, brake-shoes and actuating bar 10 substantially one firm and always reliable member of the mechanism.

Referring to Fig. 1 the operation of braking is as follows. When the wagon is drawn forward by the draft animals and the pull is upon the usual double or swingle tree not shown, the tongue of the wagon will hang at a normal level with the forward end of the tongue resting in the neck-yoke ring (not shown), but the moment the pull upon the tongue near its rear end is changed to a push against the neck-yoke, the latter, being suspended on the neck-yoke straps of the harness, will be caused to rise or swing upwardly, thus exerting a pull upon the chain 20. This pulling force is changed by the lever 12 into a pushing force on the bar 10, forcing the brake-beam and its shoes toward the wheels. This force will be in substantially the same ratio as the force of the tongue pushing against the neck-yoke. In other words, the steeper the incline the greater the braking force. The bar 10 is made adjustable so as to place the brake-shoes in exact relation toward the wheels, by providing the plurality of holes indicated in the forward end of the bar 10 for the pivot bolt 11. This adjustment may also be effected in equally as exact and efficient a manner by shortening or lengthening the chain 20, and, as stated in the foregoing, the avoidance of braking in backing up, and thus lifting the forward end of the tongue, is taken care of by simply permitting the necessary vertical movement of the brake-beam and brake-shoes indicated by the space between the reach and the bar 10.

Having thus described our invention, we claim as new and desire to secure by Letters Patent—

In an automatic wagon-brake, the combination with a wagon, of a brake-beam, brake-shoes and thrust-bar, all rigidly secured together, said beam, shoes and bar being mounted for up and down movement, a lever to which said bar is adjustably pivoted to vary the length of the bar between said lever and brake-beam, means tending to draw said bar away from the brake-wheels of the wagon, and a flexible connection between the power-end of said lever and the wagon-tongue for communicating movement from the latter to said lever, bar, brake-beam and brake-shoes.

In testimony whereof we have hereunto set our hands in the presence of two subscribing witnesses.

JOHAN P. JENSEN.
JENS P. JENSEN.
HANS C. PETERSEN.

Witnesses:
 Jos. A. Dumais,
 Albert Madore.

Copies of this patent may be obtained for five cents each, by addressing the "Commissioner of Patents. Washington, D. C."